United States Patent

[11] 3,627,655

[72] Inventor Evelio A. Perez-Albuerne
Rochester, N.Y.
[21] Appl. No. 859,206
[22] Filed Sept. 18, 1969
[45] Patented Dec. 14, 1971
[73] Assignee Eastman Kodak Company
Rochester, N.Y.

[54] PROCESS FOR DECREASING SURFACE RESISTIVITY OF ORGANIC SEMICONDUCTORS BY ULTRAVIOLET RADIATION
18 Claims, No Drawings

[52] U.S. Cl. ........ 204/158 R
[51] Int. Cl. ........ B01j 1/10
[50] Field of Search ........ 204/158

[56] References Cited

UNITED STATES PATENTS 3,271,180 9/1966 White ........ 204/158 X

*Primary Examiner*—Howard S. Williams
*Attorneys*—William H. J. Kline, James R. Frederick and Fred L. Denson

ABSTRACT: The surface resistivity of certain organic semiconductors and semiconductor-containing elements is controlled by exposure to ultraviolet radiation.

PROCESS FOR DECREASING SURFACE RESISTIVITY OF ORGANIC SEMICONDUCTORS BY ULTRAVIOLET RADIATION

This invention relates to a process for controlling the surface resistivity of certain organic semiconductors and films containing these materials.

The usefulness of semiconducting organic materials is associated to a large extent with a combination of properties such as 1) desirable electronic properties (e.g., low-electrical resistivity), 2) chemical stability, and 3) physical and chemical properties which would permit the preparation of useful articles of manufacture. The first two properties mentioned above are shared by a number of inorganic materials well known in the art, such as metals (e.g., silver, copper) or inorganic semiconductors (e.g., germanium, silicon). However, the great chemical versatility of organic molecules gives the organic semiconductors a distinct advantage over inorganic materials to the extent that it is possible to introduce and modify physical and chemical properties such as solubility, melting point, etc., by relatively minor changes in the chemical structure of the organic molecules. In other words, the organic semiconductors open the possibility for tailor-made electrically conducting materials with properties not found in inorganic substances.

The preparation or organic materials showing appreciable electrical conductivity has been the subject of several publications and reviews. They may be classified in four broad groups:

1. Noncomplex organic semiconductors, consisting of single monomeric species. (The term "semiconductor" as used herein describes electrically conducting materials with a resistivity in the range $10^{-3}$ to $10^{9}$ ohm-cm.)

2. Complex organic semiconductors, consisting in general of at least two monomeric species (comprising an electron donor moiety and an electron acceptor moiety, respectively) associated to a certain extend through charge transfer.

3. Noncomplex polymeric organic semiconductors

4. Complex organic semiconductors where at least one of the electron donor moieties or the electron acceptor moieties is attached to, or part of, a polymeric chain. Most of the known organic semiconductors, showing resistivity values lower than $10^{4}$ ohm-cm., belong to the second and fourth categories, but many of these are unstable under ambient conditions, hence reducing their usefulness considerably. Furthermore, those which show reasonable stability are usually obtained in the form of insoluble, infusable powders, which in general are not amenable to fabrication into useful articles of manufacture.

In more recent publications (e.g., Y. Matsunaga, J. Chem. phys., 42, 2248 (1965) and Y. Okamoto, S. Shah, and Y. Matsunaga, J. Chem. Phys., 43, 1904 (1965) new organic semiconductors of low-resistivity have been described in which a sulfur-containing polycyclic hydrocarbon (tetrathiotetracene) acts as electron donor in dative-type charge transfer complexes with any one of three organic acceptors: o-chloranil, o-bromanil and tetracyanoethylene. (The term "dative-type charge transfer complex" describes a charge transfer complex between an electron donor and an electron acceptor in which the constituents are in an ionized form in the ground state of the complex.) These complexes may also be designated by the term "ion-radical salts," the electron donor becoming the "cation-radical" and the acceptor becoming the "anion-radical." The described complexes, however, lack solubility in organic solvents as well as in water. Likewise, tetrathiotetracene itself, although showing one of the lower electrical resistivities of the noncomplex organic semiconductors reported (resistivity of the compressed powder is of the order of $10^{4}$ ohm-cm), is only very slightly soluble at room temperature in a few very strong organic solvents.

In U.S. Ser. No. 851,088 filed Aug. 18, 1969 by E. A. Perez-Albuerne are described certain Group VI*a* element-containing polycyclic hydrocarbon complexes which are useful as organic semiconductors. These materials are distinguishable from those described in the preceding paragraph in that they are either soluble in ordinary solvents, or can be readily prepared from soluble derivatives, and thus can be fabricated into useful coatings, films, etc. The surface resistivity of films of these materials is generally less than $10^{11}$ ohms/square depending on the composition of the semiconductor. It is often desirable to change the surface resistivity of a film without having to prepare a different semiconductor and film which would have the desired surface resistivity.

It is therefore an object of this invention to provide a novel process for controlling the surface resistivity of a certain class of organic semiconductors.

It is a further object of this invention to provide a novel process for controlling the surface resistivity of elements containing a certain class of organic semiconductors.

It is yet another object of this invention to provide semiconductor elements having a controlled surface resistivity.

These and other objects of this invention are accomplished by exposing to ultraviolet radiation an organic semiconductor containing a polycyclic aromatic hydrocarbon having at least two positions joined by a bridge containing two to four atoms of a Group VI*a* element (e.g., sulfur, selenium, tellurium, etc.). The polycyclic aromatic hydrocarbon generally contains two to six fused rings. It has been found that exposure to ultraviolet radiation causes a decrease in the surface resistivity of the semiconductor. A significant advantage resides in the ability to precisely control the surface resistivity of a semiconductor element containing a layer of the semiconductor on a supporting substrate. Such an element can be initially prepared having the desired resistivity or an element which has been in use can have its surface resistivity decreased by exposing it to ultraviolet radiation.

The surface resistivity of the semiconductor or of an element containing a layer of the semiconductor is decreased by exposing it to a quantity of ultraviolet radiation sufficient to obtain the desired decrease. While any source of ultraviolet radiation is suitable, a typical ultraviolet source is a mercury arc having a power of from about 50 to about 500 watts. Exposure times for use with such a source can vary from 10 seconds to 2 hours and preferably 30 seconds to 1 hour. When using a mercury arc, the distance from the source to the semiconductor is generally from about 1 to about 30 inches and preferably 3 to about 20 inches. Those skilled in the art appreciate the fact that greater distances require longer exposure times to achieve a fixed decrease in surface resistivity and conversely, that shorter distances require shorter exposure times. The exposure can range from about $10^{6}$ to about $10^{10}$ ergs/cm.$^{2}$ and preferably from $10^{7}$ to $10^{9}$ ergs/cm.$^{2}$.

The semiconductors useful in the invention can be classified into two categories. I. The first includes those polycyclic aromatic hydrocarbons having at least two positions joined by a bridge containing two to four atoms of a Group VI*a* element. II. The second encompasses materials having an electron donating moiety (including a cation-radical derived therefrom) which is derived from a polycyclic aromatic hydrocarbon having at least two positions joined by a bridge containing two to four atoms of a Group VI*a* element and an electron acceptor moiety (including an anion derived therefrom) which is either inorganic or organic. The latter material (II) can also contain combined neutral species of the material from which the cation is derived.

The semiconductors of Class II above which are useful in this invention have the following formula:

$$(D)_k{}^o(D^{+n})_m(Z^{-p})_q$$

wherein:

D represents a fused polycyclic aromatic hydrocarbon moiety containing two to six fused aromatic rings having at least two positions joined by a bridge containing two to four atoms of a Group VI*a* element such as sulfur, selenium, tellurium, etc. (Handbook of Chemistry and Physics, 38th edition, pp. 394–95), including substituted polycyclic aromatic hydrocarbons containing such bridges such as a tetrathiotetracene moiety, a hexathiopentacene moiety, a tetraselenotetracene moiety, a hexaselenopentacene moiety, a tetratellurotetracene moiety, a hexatelluropentacene moiety, etc., wherein each of the above-described moieties include substituted as well as unsubstituted forms, typical substituents being in the aromatic nucleus and including one or more alkyl groups, aryl groups, alkoxy groups, hydroxy groups, carboxy groups, halogen groups, amino groups, acyl groups, aryloxy groups, etc.;

Z represents one or more electron accepting anions including a. inorganic anions such as iodide, thiocyanate, fluoroborate, ferricyanide, molybdate, tungstate, etc.;

b. monomeric organic anions derived from monomeric organic acids such as aromatic carboxylic acids, e.g., benzoic, phthalic, terephthalic, pyromellitic, gallic, naphthoic, naphthalene dicarboxylic, naphthalene tetracarboxylic, etc.; aliphatic monocarboxylic acids such as acetic, dichloroacetic, propionic, methoxyacetic, butyric, etc.; aliphatic dicarboxylic acids such as oxalic, malonic, succinic, glutaric, etc.; aliphatic polycarboxylic acids such as citric acid; unsaturated carboxylic acids such as acrylic, maleic, fumaric, muconic, acetylenedicarboxylic, etc.; sulfonic acids such as sulfonic, p-toluene sulfonic, naphthalene sulfonic, naphthol disulfonic, methyl sulfonic, etc.; heterocyclic acids wherein the heterocyclic nucleus contains five to six atoms including one or more nitrogen, oxygen or sulfur atoms such as barbituric, cyanuric, thiobarbituric, quinolinic, chelidonic, etc.;

c. polymeric anions derived from anion-furnishing organic polymers such as poly(vinyl methyl ether-maleic anhydride), polyacrylic acid, sulfonated polystyrene, poly(methyl methacrylate-methacrylic acid), poly(ethyl acrylate-acrylic acid), poly(ethylenemaleic acid), etc.;

$-p$ is the formal negative charge on each of the Z anions present;

$q$ is the number of Z anions present;

$(D)^{o}$ represents a combined neutral D moiety;

$n$ is the formal positive charge on each D cation;

$m$ represents the number of D cations present; and $k$ represents the number of (D) neutral moieties present.

In the above formula, Z can be the same or different anions, $-p$ being the charge on each one of the anions. Of course, $-p$ and $q$ can be different for each of the anions when a mixture of anions is present. When Z is an inorganic anion or a monomeric organic anion derived from a monomeric organic acid, $p$ is typically an integer from one to six. When Z is a polymeric anion derived from anion-furnishing organic polymers, $p$ can be 100 or greater depending on the number of anion centers present in the polymer chain which, in turn, is dependent upon the molecular weight of the polymer. The number of Z anions present, $q$ $l$, generally can be from one to about six. The number of $D^{+n}$ cations, $m$, generally ranges from one to about six, and can be a mixture of different cation species derived from various polycyclic aromatic hydrocarbon materials. The formal positive charge on each D cation, $+n$, can be from one to six. The number of $D^{o}$ combined neutral moieties, $k$ is generally from zero to about five, and not necessarily an integer. $D^{o}$ can also be a mixture of generally from zero to about five, and not necessarily an integer. $D^{o}$ can also be a mixture of neutral polycyclic aromatic hydrocarbon neutral polycyclic aromatic hydrocarbon moieties. The complexes described herein are electrically balanced so that $nm$ is equal to $pq$. When a mixture of cations and/or anions is present, each of these expressions stands for the sum of such products over all the moieties present. The total number of D moieties present is equal to $(m+k)$.

The cation or neutral species of the semiconductors represented by the above formula are preferably derived from those semiconductors of Class I. The semiconductors of Class I generally have one of the following formulas:

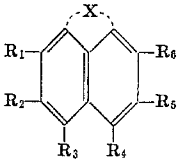

III

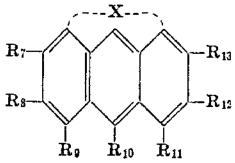

IV wherein:

X represents a bridge containing two to three sulfur, tellurium, or selenium atoms;

$R_1$ through $R_{13}$ represent any of the following:

a. a hydrogen atom, b. an alkyl group having one to eight carbon atoms, e.g., methyl, ethyl, propyl, butyl, isobutyl, octyl, dodecyl, etc., including a substituted alkyl group having one to 18 carbon atoms such as a. alkoxyalkyl, e.g., ethoxypropyl, methoxybutyl, propoxymethyl, etc., b. aryloxyalkyl, e.g., phenoxyethyl, naphthoxymethyl, phenoxypentyl, etc., c. aminoalkyl, e.g., aminobutyl, aminoethyl, aminopropyl, etc., d. hydroxyalkyl, e.g., hydroxypropyl, hydroxyoctyl, hydroxymethyl, etc., e. aralkyl, e.g., benzyl, phenylethyl, etc., f. alkylaminoalkyl, e.g., methylaminopropyl, methylaminoethyl, etc., and also including dialkylaminoalkyl, e.g., diethylaminoethyl, dimethylaminopropyl, propylaminooctyl, etc., g. haloaminoalkyl, e.g., dichloroaminoethyl, N-chloro-N-ethylaminopropyl, bromoaminohexyl, etc., h. arylaminoalkyl, e.g., phenylaminoalkyl, diphenylaminoalkyl, N-phenyl-N-ethylaminopentyl, N-phenyl-N-chloroaminohexyl, naphthylaminomethyl, i. nitroalkyl, e.g., nitrobutyl, nitroethyl, nitropentyl, etc., j. cyanoalkyl, e.g., cyanopropyl, cyanobutyl, cyanoethyl, etc., k. haloalkyl, e.g., chloromethyl, bromopentyl, chlorooctyl, etc., l. alkyl substituted with an acyl group having the formula $$-\overset{O}{\overset{\|}{C}}-R$$

wherein R is hydroxy, halogen, e.g., chlorine, bromine, etc., hydrogen, aryl, e.g., phenyl, naphthyl, etc., lower alkyl having one to eight carbon atoms, e.g., methyl, ethyl, propyl, etc., amino including substituted amino, e.g., diloweralkylamino, lower alkoxy having one to eight carbon atoms, e.g., butoxy, methoxy, etc., aryloxy, e.g., phenoxy, naphthoxy, etc.;

c. an aryl group, e.g., phenyl, naphthyl, anthryl, fluorenyl, etc., including a substituted aryl group such as a. alkoxyaryl, e.g., ethoxyphenyl, methoxyphenyl, propoxynaphthyl, etc., b. aryloxyaryl, e.g., phenoxyphenyl, naphthoxyphenyl, phenoxynaphthyl, etc., c. aminoaryl, e.g., aminophenyl, aminonaphthyl, aminoanthryl, etc., d. hydroxyaryl, e.g., hydroxyphenyl, hydroxynaphthyl, hydroxyanthryl, etc., e. biphenylyl, f. alkylaminoaryl, e.g., methylaminophenyl, methylaminonaphthyl, etc., and also including dialkylaminoaryl, e.g., diethylaminophenyl, dipropylaminophenyl, etc., g. haloaminoaryl, e.g., dichloroaminophenyl, N-chloro-N-ethylaminophenyl, bromoaminophenyl, etc., h. arylaminoaryl, e.g., phenylaminophenyl, diphenylaminophenyl, N-phenyl-N-ethylaminophenyl, N-phenyl-N-chloroaminophenyl, naphthylaminophenyl, etc., i. nitroaryl, e.g., nitrophenyl, nitronaphthyl, nitroanthryl, etc., j. cyanoaryl, e.g., cyanophenyl, cyanonaphthyl, cyanoanthryl, etc.

k. haloaryl, e.g., chlorophenyl, bromophenyl, chloronaphthyl, etc.

l. aryl substituted with an acyl group having the formula $$-\overset{\displaystyle O}{\overset{\|}{C}}-R$$

wherein R is hydroxy, halogen, e.g., chlorine, bromine, etc., hydrogen, aryl, e.g., phenyl, naphthyl, etc., amino including substituted amino, e.g., diloweralkylamino, lower alkoxy having one to eight carbon atoms, e.g., butoxy, methoxy etc., aryloxy, e.g., phenoxy, naphthoxy, etc., lower alkyl having one to eight carbon atoms, e.g., methyl, ethyl, propyl, butyl, etc., m. alkaryl, e.g., tolyl, ethyl phenyl, propyl naphthyl, etc.;

d. a two to three membered sulfur, selenium or tellurium bridge joining together any two positions represented by $R_1$ through $R_{13}$;

e. an aryloxy group e.g. phenoxy, naphthoxy, etc.;

f. a halogen atom e.g. bromine, iodine, etc.;

g. an alkoxy group having one to eight carbon atoms such as butoxy, methoxy, etc.;

h. a nitro group;

i. a sulfo group;

a thiol group;

k. a substituted sulfonyl group;

l. a substituted sulfinyl group;

m. a hydroxy group;

n. a cyano group;

o. an amino group having the formula $$-N\begin{matrix} \diagup R_{14} \\ \diagdown R_{15} \end{matrix}$$

wherein $R_{14}$ and $R_{15}$ are the same or different including hydrogen, lower alkyl having one to eight carbon atoms such as ethyl, propyl, butyl, etc., aryl such as phenyl, naphthyl, etc., halogen e.g. chlorine, bromine, etc.

p. substituted acyl such as those having the formula $$-\overset{\displaystyle O}{\overset{\|}{R}}-R_{16}$$

wherein $R_{16}$ is hydroxy, halogen e.g. chlorine, bromine, etc.; hydrogen, aryl e.g. phenyl, naphthyl, etc., amino including substituted amino e.g. diloweralkylamino, lower alkoxy having one to eight carbon atoms e.g. butoxy, methoxy, etc., aryloxy e.g. phenoxy, naphthoxy, etc., alkyl e.g., methyl, ethyl, propyl, etc. or q. positions of bonding for additional fused aromatic nuclei which may further be substituted by any of the substituents set forth in (a) through (p) above.

Typical compounds defined by III and IV above are set forth in the following table I.

TABLE I 1. 1,8 Dithionaphthalene
2. 1,8;4,5 Tetrathionaphthalene
3. 1,9 Dithioanthracene
4. 1,95,10 Tetrathioanthracene
5. 1,9;4,10 Tetrathioanthracene
6. 1,10 Dithiopyrene
7. 1,10;5,6 Tetrathiopyrene
8. 1,10;2,3 Tetrathiopyrene
9. 1,10;2,3;5,6 Hexathippyrene
10. 1,10; 2,3;5,6;7,8 Octathiopyrene
11. 3,4 Dithioperylene
12. 3,4;9,10 Tetrathioperylene
13. 5,6 Dithiotetracene
14. 5,6;11,12 Tetrathiotetracene
15. Hexathioanthracene
16. Hexathiopentacene
17. Trithioanthacene
18. Trithiopentacene
19. 1,8 Diselenonaphthalene
20. 2,8;4,5 Tetraselenonaphthalene
21. 1,9 Diselenoanthracene
22. 1,9;5,10 Tetraselenoanthracene
1,10 Diselenopyrene
24. 1,10;5,6 Tetraselenopyrene
25. 1,10;2,3 Tetraselenopyrene
26. 1,10;2,3;5,6 Hexaselenopyrene
27. 1,10;2,3;5,6;7,8 Octaselenopyrene
28. 3,4 Diselenoperylene
29. 3,4;9,10 Tetraselenoperylene
30. 5,6 Diselenotetracene
31. 5,6;11, 12 Tetraselenotetracene
32. Hexaselenoanthracene
33. Hexaselenopentacene
34. Triselenoanthracene
35. Triselenopentacene
36. 1,8 Ditelluronaphthalene
37. 1,8;4,5 Tetratelluronaphthalene
38. 1,9 Ditelluroanthracene
39. 1,9;5,10 Tetratelluroanthracene
40. 1,9;4,10 Tetratelluroanthracene
41. 1,10 Ditelluropyrene
42. 1,10;5,6 Tetratelluropyrene
43. 1,10;2,3 Tetratelluropyrene
44. 1,10;2,3;5,6 Hexatelluropyrene
45. 1,10;2,3;5,6; 6,8 Octatelluropyrene
46. 3,4 Ditelluroperylene
47. 3,4;9,10 Tetratelluroperylene
48. 5,6 Ditellurotetracene
49. 5,6;11,12 Tetratellurotetracene
50. Hexatelluroanthracene
51. Hexatelluropentacene
52. Tritelluroanthracene
53. Tritelluropentacene
54. 2,9 Dimethyl-5,6;11,12 Tetrathiotetracene
55. 2,9 Diphenyl-5,6;11,12 Tetrathiotetracene Typical semiconductors which belong to the herein described general class are set forth in the following table II.

TABLE II

| Cation or Electron Donating Moiety Derived From Compound No. | Anion or Electron Accepting Moiety |
|---|---|
| 14 | Thiocyanate |
| 14 | Bromide |
| 14 | Nitrate |
| 14 | Fluoroborate |
| 14 | Sulfate |
| 14 | Ferricyanide |
| 21 | Molybdate |
| 23 | Tungstate |
| 25 | Benzoate |
| 13 | Phthalate |
| 11 | Terephthalate |
| 3 | Pyromellitate |
| 9 | Sulfonate |
| 15 | p-Toluenesulfonate |
| 27 | 2-Naphthoate |
| 23 | 2-Naphthalenesulfonate |
| 29 | 2,3-Naphthalenesulfonate |
| 23 | 1,4,5,8-Naphthalenetetra-carboxylate acetate |
| 19 | Citrate |
| 23 | Gallate |
| 35 | Methoxyacetate |
| 1 | Dichloroacetate |
| 3 | Acrylate |
| 14 | Maleate |
| 14 | Fumarate |
| 14 | Acetylenedicarboxylate |
| 14 | Oxalate |
| 19 | Muconate |
| 23 | 1-Naphthol-3,6-disulfonate |
| 27 | Barbiturate |
| 25 | Cyanurate |
| 30 | 2-Thiobarbotriate |
| 32 | Quinolinate |
| 34 | Chelidonate |

Cation or Electron

| Donating Moiety Derived From Compound No. | Anion or Electron Accepting Moiety |
|---|---|
| 28 | 2,5-Dichloro-3,6-di-hydroxy-p-benzoquinone |
| 26 | Poly(vinyl methyl ether-maleic anhydride) |
| 14 | Polyacrylic acid |
| 14 | Polyacrylic acid |
| 12 | Sulfonated polystyrene |
| 10 | Poly(methyl methacrylate-methacrylic acid) |
| 11 | Poly(ethylene-maleic acid) |
| 15 | Poly(ethyl acrylate-acrylic acid) |

Semiconductor elements can be prepared with the semiconductors described herein by blending a solution of the semiconductor together with a binder, when necessary or desirable, and coating on or imbibing into a suitable substrate or forming a self-supporting layer. Evaporation of the solvent produces a coating in which the conducting species is dispersed in the polymeric binder. It is also possible to coat a soluble derivative of an insoluble semiconducting material, and then regenerate the latter by heating or chemical treatment of the coating. Another method useful for producing conducting coatings of complex organic semiconductors is by successive applications of donor and acceptor layers, the semiconductor being formed in the vicinity of the interface. This is also accomplished if the first component of the semiconductor is coated and then exposed to a vapor of the second species. A polymeric acceptor may be coated from a solvent with or without additional polymeric binder and then by overcoating with a soluble derivative of the donor, a semiconducting polymer is obtained.

Preferred binders for use in preparing the semiconductor elements are generally film-forming materials. Materials of this type comprise natural as well as synthetic materials. Typical of these materials are:

I. Natural resins including gelatin, cellulose ester derivatives such as alkyl esters of carboxylated cellulose, hydroxy ethyl cellulose, carboxy methyl cellulose, carboxy methyl hydroxy ethyl cellulose, etc.;

II. Vinyl resins including a. polyvinyl esters such as a vinyl acetate resin, a copolymer of vinyl acetate and crotonic acid, a copolymer of vinyl acetate with an ester of vinyl alcohol and a higher aliphatic carboxylic acid such as lauric acid or stearic acid, polyvinyl stearate, a copolymer of vinyl acetate and maleic acid, a poly(vinylhaloarylate) such as poly(vinyl-m-bromobenzoate), a terpolymer of vinyl butyral with vinyl alcohol and vinyl acetate, a terpolymer of vinyl formal with vinyl alcohol and vinyl acetate, etc.;

b. vinyl chloride and vinylidene chloride polymers such as a poly(vinylchoride), a copolymer of vinyl chloride and vinyl isobutyl ether, a copolymer of vinylidene chloride and acrylonitrile, a terpolymer of vinyl chloride, vinyl acetate and vinyl alcohol, poly(vinylidene chloride) a terpolymer of vinyl chloride, vinyl acetate and maleic anhydride, a copolymer of vinyl chloride and vinyl acetate, etc.;

c. styrene polymers such as a polystyrene, a nitrated polystyrene, a copolymer of styrene and monoisobutyl maleate, a copolymer of styrene with methacrylic acid, a copolymer of styrene and butadiene, a copolymer of dimethylitaconate and styrene, polymethylstyrene, etc.;

d. methacrylic acid ester polymers such as a poly(alkylmethacrylate), etc.;

e. polyolefins such as chlorinated polyethylene, chlorinated polypropylene, etc., f. poly(vinyl acetals) such as a poly(vinyl butyral), etc.; and g. poly(vinyl alcohol);

III. Polycondensates including a. a polyester of 1,3-disulfobenzene and 2,2-bis(4-hydroxyphenyl)propane;

b. a polyester of diphenyl-p,p'-disulfonic acid and 2,2-bis(4-hydroxyphenyl)propane;

c. a polyester of 4,4'-dicarboxyphenyl ether and 2,2-bis(4-hydroxyphenyl)propane;

d. a polyester of 2,2-bis(4-hydroxyphenyl)propane and fumaric acid;

e. pentaerythrite phthalate;

f. resinous terpene polybasic acid;

g. a polyester of phosphoric acid and hydroquinone;

h. polyphosphites;

i. polyester of neopentylglycol and isophthalic acid;

j. polycarbonates including polythiocarbonates such as the polycarbonate of 2,2-bis(4-hydroxyphenyl)propane;

k. polyester of isophthalic acid, 2,2-bis-4-β-hydroxyethoxy)phenyl propane and ethylene glycol;

l. polyester of terephthalic acid, 2,2-bis-4-β-hydroxyethoxy)phenyl and ethylene glycol;

m. polyester of ethylene glycol, neopentyl, glycol, terephthalic acid and isophthalic acid;

n. polyamides;

o. ketone resins; and p. phenolformaldehyde resins;

IV. Silicone resins;

V. Alkyd resins including styrene-alkyd resins, silicone-alkyd resins, soya-alkyd resins, etc.; and VI. Polyamides.

Solvents of choice for preparing coating compositions useful in the present invention can include a number of solvents such as alcohols including aliphatic alcohols preferably having one to eight carbon atoms including methanol, ethanol, propanol, isopropanol, etc., aromatic alcohols, polyhydride alcohols, substituted alcohols including 2-methoxyethanol, organic carboxylic acids having one to 10 carbon atoms such as formic, acetic, propionic, etc., substituted carboxylic acids, lower dialkylsulfoxides such as dimethylsulfoxide, and water. Also included are mixtures of these solvents among themselves or with other organic solvents such as ketones including acetone, 2-butanone, methyl-isobutylketone, cyclohexanone, etc., and esters derived from organic carboxylic acids having one to 10 carbon atoms.

In preparing the coatings useful results are obtained where the semiconductor is present in an amount equal to at least about one weight percent of the coating. The upper limit in the amount of semiconductor present can be widely varied in accordance with usual practice. In those cases where a binder is employed, it is normally required that the semiconductor be present in an amount from about one weight percent of the coating to about 99 weight percent of the coating. A preferred weight range for the semiconductor in the coating is from about 10 weight percent to about 60 weight percent.

Coating thicknesses of the semiconductor composition on a support can vary widely. Normally, a coating in the range of about 0.0001 inch to about 0.01 inch before drying is useful for the practice of this invention. The preferred range of coating thickness is in the range from about 0.0002 inch to about 0.0008 inch before drying although useful results can be obtained outside of this range.

Suitable substrates for coating the semiconductor-containing element can include any of a wide variety of supports, for example, fibers, films, glass, paper, metals, etc.

Because of their chemical and physical properties, the organic semiconductors described herein are readily incorporated into thin films having a surface resistivity of less than $10^{11}$ ohm/square. In accordance with this invention, this surface resistivity can be decreased, by up to several orders of magnitude, to a desired value by exposure to ultraviolet radiation. The resistivity is substantially independent of relative humidity and remains within this range even in vacuum. As a result of their good electrical properties, these films are useful in preparing a number of articles of manufacture. For example, one such use is in an antistatic photographic film element comprising an inert film support (which may carry a subbing layer to improve adhesion), a conducting layer containing one of the organic semiconductors described herein and a silver halide emulsion layer which is sensitive to electromagnetic radiation. These layers can be arranged having the conducting layer and the emulsion layer on each side of the support, and also both layers can be on the same side, with either one on top of the other. In some cases, it is desirable to include additional layers of insulating polymer which can be incorporated into the element, either below, between, or above any of the above-mentioned layers.

Another use is in antistatic magnetic tape, comprising the same arrangement of layers as in the above-described photographic film element, with the exception that the photographic emulsion is replaced by a suitable layer of magnetic material.

A further use is in a direct electron recording film element comprising an inert insulating film support (which may carry a subbing layer to improve adhesion), a conducting layer containing one of the organic semiconductors described herein and a layer of a silver halide emulsion which is sensitive to electron beams. In this case, both layers are placed on one side of the support with either one on top of the other. Also, additional layers of insulating polymer may be incorporated, as in the preceding elements, to provide particular advantages such as improvement of adhesion, elimination of undesirable changes in the electron-sensitivity of the emulsion, etc.

A fourth use is in electrophotographic elements, comprising a conducting layer which contains one of the organic semiconductors described herein. The conducting layer is coated on an inert support, and on top of the conducting layer is a second layer containing a photoconductor. Additional thin layers of insulating polymers may also be included in this case, as in the preceding elements, which may be located below, between or on top of the conducting and photoconducting layers.

Another use is in the preparation of optically transparent conducting elements. These elements have a conducting layer containing an organic semiconductor described herein applied to an insulating inert support. The thickness of the conducting layer is such that the resultant optical density is not more than about 0.5 in the spectral range from 400 to 800 nm. Such an element is used in the manufacture of antistatic windows for electronic instruments, antistatic lenses for cameras, and other optical devices, transparent heating panels, photographic products, etc.

Static-free woven goods also can contain the organic semiconductors described herein. Fibers containing the organic semiconductors can be incorporated in woven goods as the sole component or mixed with nonconducting fibers.

In electronic components, the organic semiconductors can be applied to an insulating support and shaped in any desired way to give passive electronic components such as resistors or capacitors. Also, the organic semiconductors can be incorporated as part of active components such as rectifiers or transistors.

The complexes described herein are generally prepared by reacting a soluble derivative of one of the substituted polycyclic aromatic hydrocarbons, such as tetrathiotetracene acetate, with either 1) an anion furnishing inorganic material such as an inorganic salt or acid, 2) an anion furnishing organic material such as an organic acid or salt or 3) an anionic polymer. Typical preparations are set forth in U.S. Ser. No. 851,088 filed Aug. 18, 1969 by E. A. Perez-Albuerne.

In each of these uses outlined above, the surface resistivity of the coating containing the semiconductor can be closely controlled by ultraviolet exposure as described herein.

The following examples are included for a further understanding of the invention.

EXAMPLE 1

A film of tetrathiotetracene is prepared by coating an aqueous solution of tetrathiotetracene acetate, containing 13.2 mg. of tetrathiotetracene per ml. and 5.8 mg. of poly(vinyl alcohol) per ml. on top of a subbed polyester support. This solution is applied at such a rate that a coverage of 10.2 mg. of tetrathiotetracene per sq. ft. is obtained. The tetrathiotetraene acetate coating is dried with hot air and tetrathiotetracene produced in situ by heating the coating at 120° for 3 minutes. The surface resistivity of the coating is $5.3\times10^{9}$ ohm/square. It is then exposed to ultraviolet radiation from a 100 watt mercury arc for one hour. The surface resistivity is again measured and is found to be $6.0\times10^{7}$ ohm/square.

EXAMPLE 2

The same procedure is used as given in example 1. except that the tetrathiotetracene acetate solution contains 11.7 mg. of tetrathiotetracene per ml. and 3.3 mg. of poly(vinyl alcohol) per ml. The coverage obtained is 4.17 mg. of tetrathiotetracene per sq. ft. and the tetrathiotetracene is produced by heating the coating for 1.5 min. at 120°. The surface resistivity of the coating is $5.09\times10^{9}$ ohm/square. After exposure to a 360 watt mercury arc at a distance of 3 inches for 12 minutes, the surface resistivity is again measured and found to be $1.7\times10^{8}$ ohm/square.

EXAMPLE 3

A coating of tetrathiotetracene bromide is prepared in two steps:

First: An aqueous solution of tetrathiotetracene acetate, containing 2.19 mg. of tetrathiotetracene per ml. and 5.30 mg. of poly(vinyl alcohol) per ml. is applied to a subbed polyester support at such a rate that a coverage of 2.34 mg. of tetrathiotetracene per sq. ft. is obtained. The coating is dried with hot air.

Second: The dry, pink coating is then overcoated with an aqueous solution containing 7.34 mg. of sodium bromide per ml. and 5.33 mg. of poly(vinyl alcohol) per ml. This solution is applied at such a rate that a coverage of 7.85 mg. of sodium bromide per sq. ft. is obtained. This coating is dried with hot air and passed through an oven at 120° for 1.5 minutes.

The initial surface resistivity is $2.9\times10^{9}$ ohm/square. The ultraviolet radiation source is a 360 watt mercury arc at a distance of 7 inches. After 1.5 minutes of exposure the surface resistivity is $1.0\times10^{9}$ ohm/square.

EXAMPLE 4

A coating of tetrathiotetracene maleate is prepared in a way similar to that described in example 3 with the following changes:

First: The tetrathiotetracene acetate solution contains 4.3 mg. of tetrathiotetracene per ml. and 5.65 mg. of poly(vinyl alcohol) per ml. It is applied at such a rate as to produce a coverage of 4.62 mg. of tetrathiotetracene per sq. ft.

Second: An aqueous solution of maleic acid is coated. It contains 15 mg. of maleic acid per ml. and 5.76 mg. of poly(vinyl alcohol) per ml. It is applied at such a rate as to produce a coverage of 5.34 mg. of maleic acid per sq. ft.

The initial surface resistivity is $8.7\times10^{7}$ ohm/square. After 1 minute of exposure to ultraviolet radiation from a 360 watt mercury arc at a distance of 3 inches, the surface resistivity is $5.9\times10^{7}$ ohm/square.

EXAMPLE 5

A solution of tetrathiotetracene citrate containing 3.18 mg. of tetrathiotetracene per ml. and 1.11 mg. of alcohol soluble cellulose butyrate per ml. is prepared. The solvent is methanol containing about six percent n-propyl alcohol. This solution is coated on a subbed polyester support on a whirler plate, spinning at 600 r.p.m. for three minutes. The initial surface resistivity is $1.4\times10^{10}$ ohm/square. After 30 seconds of exposure to ultraviolet radiation from a 360 watt mercury arc at a distance of 7 inches, the surface resistivity is $3.0\times10^{7}$ ohm/square.

An inspection of the data contained in the above examples demonstrates that the surface resistivity of various semiconductor elements can be decreased by exposure to ultraviolet radiation.

The invention has been described in detail with particular reference to preferred embodiments thereof, but it will be understood that variations and modifications can be effected within the spirit and scope of the invention.

I claim:

1. A process for decreasing the surface resistivity of an organic semiconductor comprising a fused polycyclic aromatic hydrocarbon having at least two positions joined by a bridge containing two to four atoms of a Group VI*a* element comprising the step of exposing the semiconductor to ultraviolet radiation.

2. A process for decreasing the surface resistivity of an organic semiconductor selected from the group consisting of a polycyclic aromatic hydrocarbon compound having at least two positions joined by a bridge containing two to four atoms of a Group VI*a* element and a material having the formula $$(D)_k^o(D^{+n})_m(Z^{-p})_q$$

wherein:

D is a fused polycyclic aromatic hydrocarbon having at least two positions joined by a bridge containing two to four atoms of a Group VI*a* element;

Z is an anion;

$-p$ is the negative charge on each Z anion;

$q$ is the number of Z anions;

$(D)^o$ is a combined neutral D moiety;

$+n$ is the charge on each D cation moiety;

$m$ represents the number of D cation moieties;

$k$ represents the number of D neutral moieties;

the relationship between $+n$, $m$, $-p$ and $q$ being such that $nm$ is equal to $pq$;

comprising the step of exposing the semiconductor to ultraviolet radiation thereby causing a decrease in surface resistivity.

3. The process of claim 2 wherein said exposure ranges from about $10^6$ ergs/cm.$^2$ to about $10^{10}$ ergs/cm$^2$.

4. The process of claim 2 wherein the light source is a mercury arc having a power of about 50 to about 500 watts.

5. The process of claim 2 wherein the semiconductor is positioned from about 1 to about 30 inches from the source of the ultraviolet radiation.

6. The process of claim 2 wherein the semiconductor is exposed to the ultraviolet radiation for a period of about 10 seconds to about two hours.

7. The process of claim 2 wherein the semiconductor is a polycyclic aromatic hydrocarbon compound having at least two positions joined by a bridge containing two to four atoms of a Group VI*a* element.

8. The process of claim 2 wherein the semiconductor is a material having the formula $$(D)_k^o(D^{+n})_m(Z^{-p})_q$$

D is a fused polycyclic aromatic hydrocarbon having at least two positions joined by a bridge containing two to four atoms of a Group VI*a* element;

Z is an anion;

$-p$ is the negative charge on each Z anion;

$q$ is the number of Z anions;

(D) is a combined neutral D moiety;

$+n$ is the charge on each D cation moiety;

$m$ represents the number of D cation moieties;

$k$ represents the number of D neutral moieties;

the relationship between $+n$, $m$, $-p$ and $q$ being such that $nm$ is equal to $pq$.

9. A process for decreasing the surface resistivity of an organic semiconductor selected from the group consisting of a polycyclic aromatic hydrocarbon compound having at least two positions joined by a bridge containing two to four atoms of a Group VI*a* element and a material having the formula $$(D)_k^o(D+^n)_m(Z^{-p})_q$$

wherein:

D is a fused polycyclic aromatic hydrocarbon having at least two positions joined by a bridge containing two to four atoms of a Group VI*a* element;

Z is an anion;

$-p$ is the negative charge on each Z anion;

$q$ is the number of Z anions;

(D) is a combined neutral D moiety;

$+n$ is the charge on each D cation moiety;

$m$ represents the number of D cation moieties;

$k$ represents the number of D neutral moieties;

the relationship between $+n$, $m$, $-p$ and $q$ being such that $nm$ is equal to $pq$;

comprising the step of a subjecting the semiconductor to an exposure of from about $10^7$ ergs/cm.$^2$ to about $10^9$ ergs/cm.$^2$ of ultraviolet radiation.

10. A process for decreasing the surface resistivity of a semiconductor element comprising a supporting substrate containing a semiconductor selected from the group consisting of a polycyclic aromatic hydrocarbon compound having at least two positions joined by a bridge containing two to four atoms of a Group VI*a* element and a material having the formula $$(D)_k^o(D^{+n})_m(Z^{-p})_z$$

wherein:

D is a fused polycyclic aromatic hydrocarbon having at least two positions joined by a bridge containing two to four atoms of a Group VI*a* element;

Z is an anion;

$-p$ is the negative charge on each Z anion;

$q$ is the number of Z anions;

(D) is a combined neutral D moiety;

$+n$ is the charge on each D cation moiety;

$m$ represents the number of D cation moieties;

$k$ represents the number of D neutral moieties;

The relationship between $+n$, $m$, $-p$ and $q$ being such that $nm$ is equal to $pq$;

comprising the step of exposing the element to ultraviolet radiation having an intensity sufficient to decrease the surface resistivity of said element.

11. The process of claim 10 wherein the ultraviolet radiation source is a mercury arc having a power of about 50 to about 500 watts.

12. The process of claim 10 wherein the semiconductor element is positioned from about 1 to about 30 inches from the source of the ultraviolet radiation.

13. The process of claim 10 wherein the semiconductor element is exposed to the ultraviolet radiation for a period of about 10 seconds to about 2 hours.

14. The process of claim 10 wherein said exposure ranges from about $10^6$ ergs/cm.$^2$ to about $10^{10}$ ergs/cm.$^2$.

15. A process for decreasing the surface resistivity of a semiconductor element comprising a supporting substrate containing tetrathiotetracene comprising the step of exposing the semiconductor element to $10^7$ to $10^9$ ergs/cm.$^2$ of ultraviolet radiation.

16. A process for decreasing the surface resistivity of a semiconductor element comprising a supporting substrate containing tetrathiotetracene bromide comprising the step of exposing the semiconductor element to $10^7$ to $10^9$ ergs/cm.$^2$ of ultraviolet radiation.

17. A process for decreasing the surface resistivity of a semiconductor element comprising a supporting substrate containing tetrathiotetracene maleate comprising the step of exposing the semiconductor element to $10^7$ to $10^9$ ergs/cm.$^2$ of ultraviolet radiation.

18. A process for decreasing the surface resistivity of a semiconductor element comprising a supporting substrate containing tetrathiotetracene citrate comprising he step of exposing the semiconductor element to $10^7$ to $10^9$ ergs/cm.$^2$ of ultraviolet radiation.

* * * * *